(12) United States Patent
Vankamamidi et al.

(10) Patent No.: US 12,373,114 B1
(45) Date of Patent: Jul. 29, 2025

(54) AVOIDING DATA REDUCTION DEBT FOR QUICKLY OVERWRITTEN DATA

(71) Applicant: Dell Products L.P., Round Rock, TX (US)

(72) Inventors: Vamsi K. Vankamamidi, Hopkinton, MA (US); Oran Baruch, Tel Aviv (IL); Ajay Karri, South Grafton, MA (US); Alexander Shknevsky, Fair Lawn, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/424,252

(22) Filed: Jan. 26, 2024

(51) Int. Cl.
*G06F 3/06* (2006.01)

(52) U.S. Cl.
CPC .......... *G06F 3/0619* (2013.01); *G06F 3/0644* (2013.01); *G06F 3/0659* (2013.01); *G06F 3/067* (2013.01)

(58) Field of Classification Search
None
See application file for complete search history.

(56) References Cited

U.S. PATENT DOCUMENTS

| 10,268,381 | B1 | 4/2019 | Armangau et al. |
| 11,782,842 | B1 | 10/2023 | Sabo et al. |
| 2020/0134048 | A1* | 4/2020 | Faibish ............... G06F 16/1748 |
| 2022/0035526 | A1* | 2/2022 | Lv ............................ G06F 3/064 |
| 2024/0028251 | A1 | 1/2024 | David et al. |

* cited by examiner

*Primary Examiner* — Brian R Peugh
(74) *Attorney, Agent, or Firm* — BainwoodHuang

(57) ABSTRACT

A technique of managing writes in a data storage system includes receiving I/O requests specifying data to be written, storing a set of the data to be written in an extent of a data log, and preventing data reduction from being performed on the set of data in the extent for at least a specified time interval, said time interval enabling portions of the set of data to be overwritten with new data and rendering data reduction of such portions unnecessary.

20 Claims, 4 Drawing Sheets

AVOIDING DATA REDUCTION DEBT FOR QUICKLY OVERWRITTEN DATA

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some data storage systems use data logs to capture incoming data being written by hosts. For example, a data storage system may record incoming writes in a data log backed by high-speed storage media, enabling the storage system quickly to acknowledge receipt of the data to the originating hosts. The storage system may then flush the data from the data log to persistent structures, which are typically backed by slower media. Such flushing may involve performing data reduction (deduplication and/or compression), writing any data that remains after data reduction to the persistent structures, and mapping the data, i.e., establishing a tree of mapping pointers that associates logical addresses of the data with corresponding physical addresses in the persistent structures.

Some storage systems augment the functionality of data logs by using extended data logs. An extended log may be used when a data log becomes bandwidth limited or runs low on space. Unlike the above-described data logs, extended logs capture data directly into slower persistent structures. Flushing from an extended log typically involves mapping the logged data in place. Background processing may be performed later, to perform data reduction, to store remaining data in new persistent structures, and to remap the data to the new persistent structures.

SUMMARY

Unfortunately, background processing of data written to extended data logs creates large amounts of processing debt in a storage system, as the system may eventually have to reduce, store, and remap the data being held therein. Such processing debt is burdensome in terms of computing resources and disk access. To make matters worse, some host applications frequently rewrite significant amounts of data. When such rewrites are captured by an extended log, they can multiply the amount of debt that must be processed. This deficiency is not limited to extended data logs but can apply to any data log that incurs background processing. What is needed is a way of reducing processing debt incurred by a data log.

The above need is addressed at least in part by an improved technique of managing a data log. The technique includes preventing background data reduction operations from being performed on data in extents of storage managed by the data log until a specified interval of time expires. The specified interval of time allows new writes from applications to replace previous writes, rendering it unnecessary to perform data reduction on data logged during the previous writes. The improved technique is particularly advantageous in so-called log-structured storage systems, which perform overwrites by invalidating old data and allocating new storage space for new data.

Certain embodiments are directed to a method of managing writes in a data storage system. The method includes receiving I/O requests specifying data to be written, storing a set of the data to be written in an extent of a data log, and preventing data reduction from being performed on the set of data in the extent for at least a specified time interval, said time interval enabling portions of the set of data to be overwritten with new data and rendering data reduction of such portions unnecessary.

Other embodiments are directed to a computerized apparatus constructed and arranged to perform a method of managing writes in a data storage system, such as the method described above. Still other embodiments are directed to a computer program product. The computer program product stores instructions which, when executed on control circuitry of a computerized apparatus, cause the computerized apparatus to perform a method of managing writes in a data storage system, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of managing a data log includes preventing background data reduction operations from being performed on data in extents of storage managed by the data log until a specified interval of time expires. The specified interval of time allows new writes from applications to replace previous writes, rendering it unnecessary to perform data reduction on data logged during the previous writes. The improved technique is particularly advantageous in so-called log-structured storage systems, which perform overwrites by invalidating old data and allocating new storage space for new data.

Figure 1:
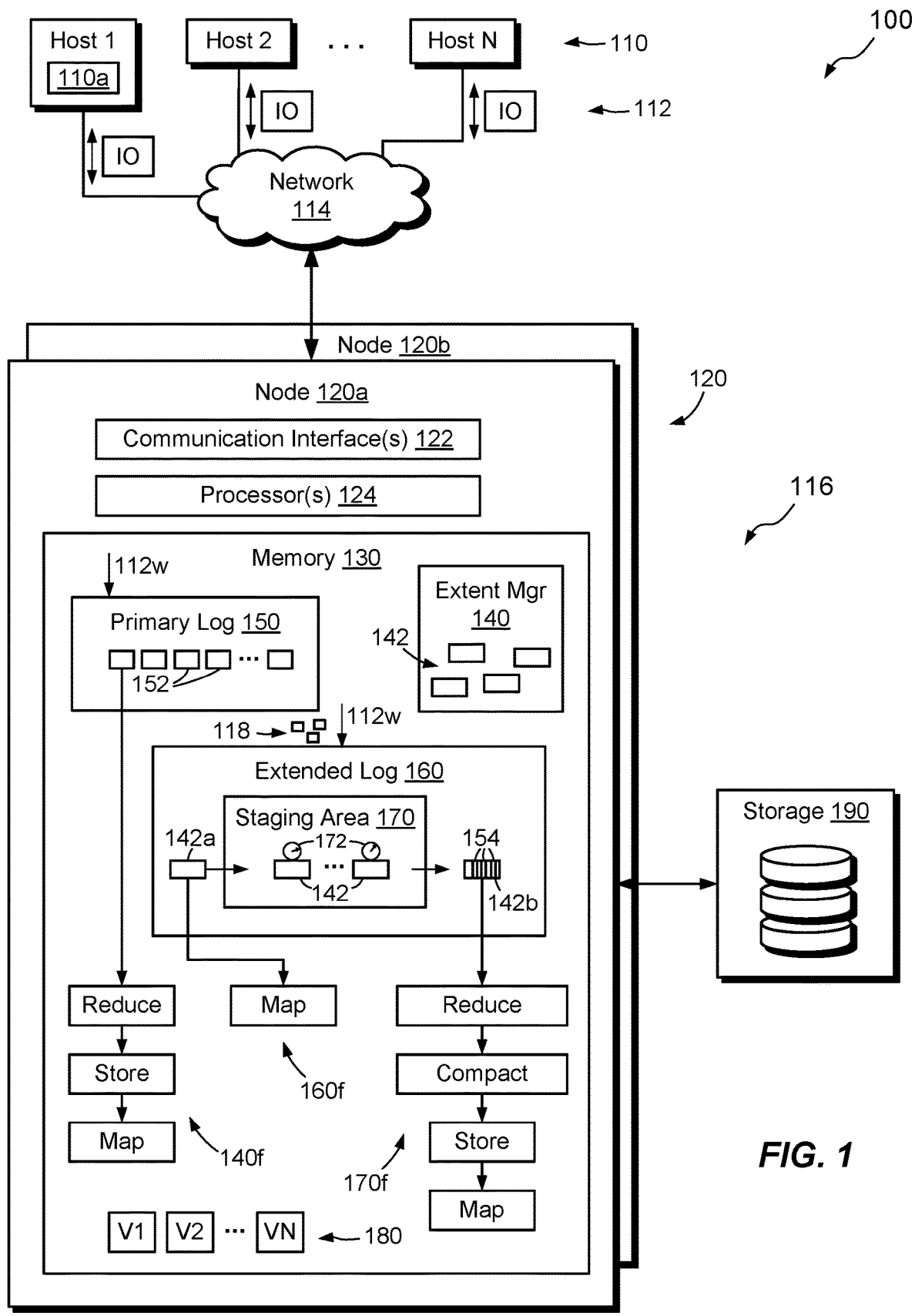
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, an extent manager 140, a primary data log 150, and an extended data log 160. The memory 130 also manages multiple volumes 180, V1 through VN.

The extent manager 140 is constructed and arranged to manage storage extents 142, which may be large, continuously-addressable ranges of storage space. In a particular example, the storage extents 142 are realized as RAID (Redundant Array of Independent Disks) elements called "sub-ubers," which may be combined with other sub-ubers to form RAID arrays called "ubers." In an example, sub-ubers are 8 GB in size and ubers are 64 GB. The sub-ubers and ubers are configured to store host data in a RAID-protected manner and are typically backed by SSDs of the storage 190.

The primary log 150 is constructed and arranged to capture data from incoming host writes 112w and to store such data in log entries 152. The log entries 152 are backed by high-speed, persistent storage media, such as NVMe storage devices. The primary log 150 thus enables host data to be stored quickly and hosts 110 to be acknowledged promptly. Within the primary log 150, log entries 152 may be arranged in a circular buffer and typically are turned over quickly, holding data only transiently.

The extended log 160 is also constructed and arranged to capture data from incoming host writes 112w. But rather than storing the data in log entries 152, the extended log 160 instead is configured to store data in storage extents 142, e.g., sub-ubers, which are the same type of structures used for longer-term storage of host data.

In example operation, the hosts 110 issue I/O requests 112 to the data storage system 116. A node 120 receives the I/O requests 112 at the communication interfaces 122 and initiates further processing. Such processing may include capturing data from host writes 112w in the primary log 150 and in the extended log 160. For example, incoming host data may be directed first to the primary log 150, where the data is stored in log entries 152. Host data is held in the log entries 152 transiently, and a flushing operation 140f is performed promptly after receipt. The flushing operation 140f includes performing data reduction, e.g., deduplication and/or compression, on the data stored in the entries 152, and storing any remaining data (after deduplication and/or compression) in extents 142. The flushing operation 140f further includes mapping the newly stored data, e.g., arranging mapping pointers in metadata (not shown) that associate logical addresses of the data with corresponding physical addresses in the extents 142. Once the data is placed in the extents 142 and mapped, the log entries 142 are freed and the initial processing of the data is complete.

If the primary log 150 becomes bandwidth limited or full, additional incoming host data 118 may be directed to the extended log 160. The extended log 160 stores the host data 118 in extents 142. For example, the extended log 160 may issue a request for an extent 142a to the extent manager 140, which responds by providing an extent 142a. The extent 142a may be a fresh (empty) extent, or it may be partially populated with data. The extended log 160 may place incoming host data 118 in the extent 142a and may perform a flushing operation 160f. The flushing operation 160f maps the new data 118 in place, by establishing mapping pointers that associate logical addresses of the data with locations within the extent 142a. Unlike the flushing operation 140f for the primary log 150, the flushing operation 160f for the extended log 160 is a lightweight flush and does not perform data reduction, nor does it store the data in a new extent 142. Rather, such operations are performed during background processing, which typically occurs later, as part of the storage system's management of background processing debt.

In accordance with improvements hereof, the extended log 160 prevents such background processing from being performed on mapped extents 142 for a specified time interval 172. For example, the extended log 160 may logically place extents 142 in a staging area 170, where extents 142 are held individually for the specified time interval. For as long as an extent 142 is logically held in the staging area 170, no background processing can take place on that extent 142. Upon expiration of the time interval 172 for an extent 142, the extent 142 is logically removed from the staging area 170, where it becomes available for background debt processing. Such background processing is shown in flushing operation 170f, which includes performing data reduction (e.g., deduplication and/or compression) compaction of data to eliminate holes, storage of remaining data in a new location (e.g., a new extent 142), and mapping of the remaining data.

Holding extents 142 in the staging area 170 for the specified interval 172 allows time for the data originally written to the extents 142 to be overwritten. For example, a host application 110a may perform frequent overwrites. If the overwrites affect data stored in portions of an extent 142 in the extended log 160, then the need to perform background processing on the overwritten portions is avoided. When the storage system uses log-structured storage, overwrites effectively invalidate previous data and allocate new storage space for new data. Thus, the result of holding an extent 142b in the staging area 170 in such a system is that the extent 142b acquires many holes 154 (invalidated portions), meaning that no data reduction, repeated storage, or mapping is needed for the data that was previously found in the holes 154. Considerable processing debt is thus avoided.

In some examples, a staging area 170 may be deployed selectively. Deployment may be automatic, based on administrator setting or the type of application, for example. In addition, staging areas 170 may be deployed on a per-volume basis. Some volumes 180 may use a staging area 170 whereas others may not.

Figure 2:
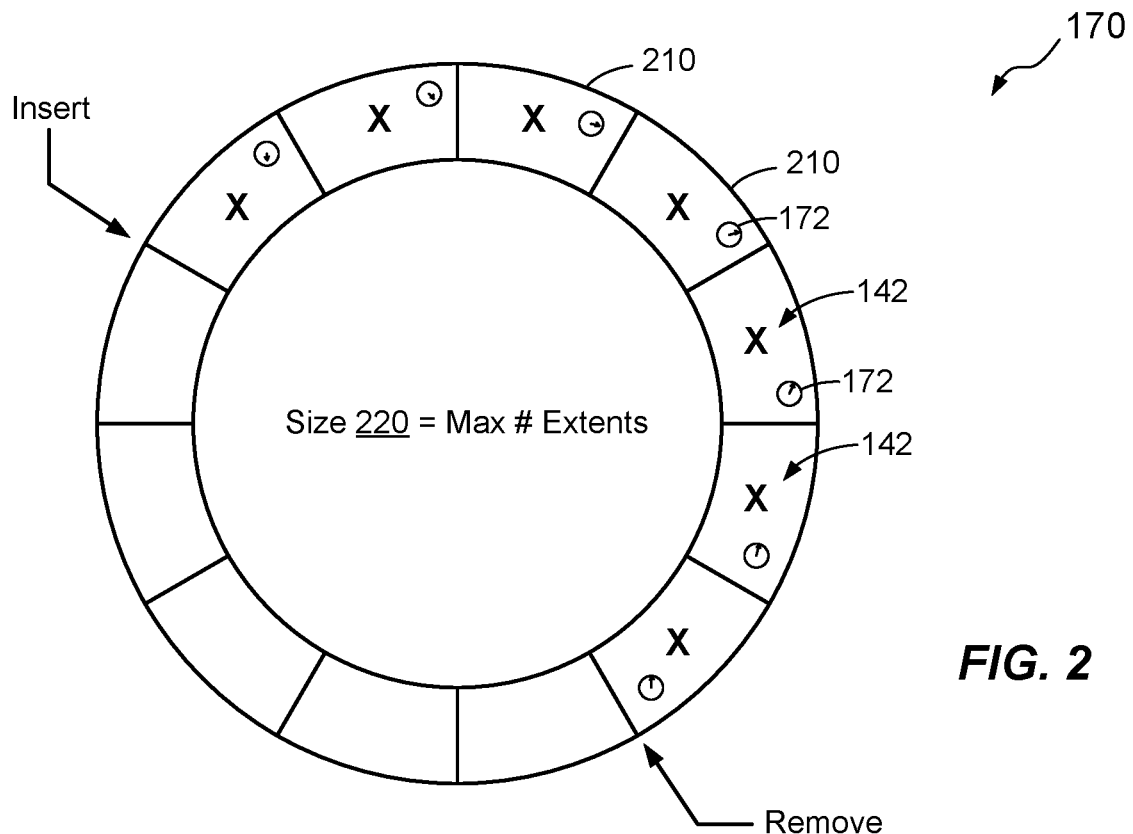
FIG. 2 is a diagram of an example staging area of FIG. 1.

FIG. 2 shows an example staging area 170 in additional detail. Here, the staging area 170 is provided as a ring buffer in volatile memory. The ring buffer includes entries 210, where each entry is provided for a respective extent 142, e.g., a respective sub-uber. Each entry 210 is associated with a respective timer, which starts when an extent 142 is inserted into the staging area 170 and counts down, for example, from the specified time interval 172 to zero. Once the timer for an extent 142 expires, the extent 142 is removed from the staging area 170 and becomes eligible for background processing.

As shown, the staging area 170 has a size 220, which limits a maximum number of extents 142 that may be held by the staging area 170 at any given time. In an example, both the size 220 of the staging area 170 and the specified time interval 172 are adjustable parameters, which may be varied based on changing circumstances in the data storage system. Adjustments in the size 220 and time interval 172 are preferably made automatically by the storage system, based on multiple factors.

Figure 3:
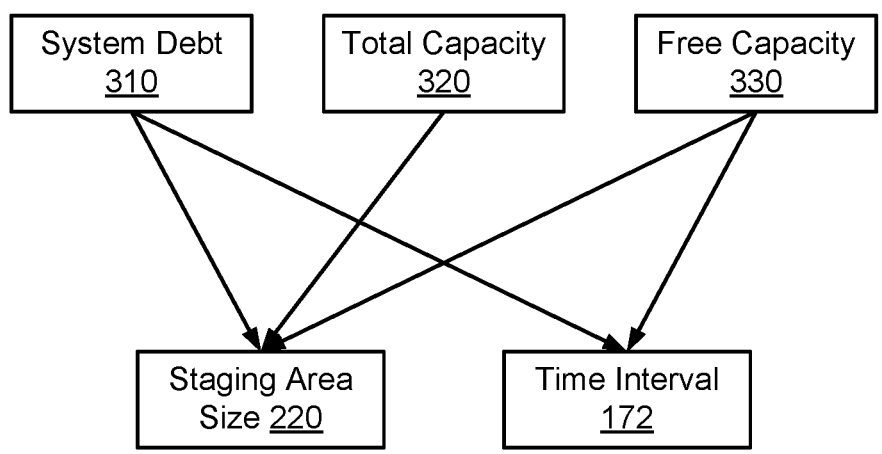
FIG. 3 is a diagram of example factors that contribute to establishing a size and a time interval associated with the staging area of FIGS. 1 and 2.

FIG. 3 shows example factors that may be considered in establishing the size 220 of the staging area 170 and the specified time interval 172. In an example, the data storage system 116 maintains certain metrics concerning its own status. These metrics include, for example, (i) an overall system debt 310, e.g., a total amount of deferred deduplication and compression that the storage system is committed to completing, (ii) a total storage capacity 320 of the storage system, e.g., a total number of terabytes that the system can store, and (iii) a free capacity 330, e.g., a total number of terabytes that are available for receiving new data.

The size 220 of the staging area 170 may be varied based on all three of these factors, 310, 320, and 330. For example, the size 220 of the staging area may be varied in a generally inverse manner with the system debt. If the system debt 310 is high, the size 220 of the staging area may be decreased to avoid adding more to the already-large system debt. Accordingly, increases in system debt may be accompanied by decreases in size 220, and decreases in system debt may be accompanied by increases in size 220. The size 220 of the staging area may be varied generally in direct proportion to the total capacity 320. Thus, larger sizes 220 of the staging area may be provided for systems having greater total capacity 320 and smaller sizes 220 of the staging area may be provided for systems having lower total capacity 320. In a similar manner, the size 220 of the staging area may also be varied in direct proportion to the free capacity 330.

The specified time interval 172 for the staging area 170 may depend upon system debt 310 and free capacity 330. In general, the time interval 172 is varied inversely with system debt 310, such that shorter intervals are used under higher debt conditions and longer intervals are used under lower debt conditions. The time interval 172 may also be varied in direct proportion to free capacity 330. If the system has a large amount of free capacity, time intervals are preferably long, to maximize the amount of data that is overwritten in the staging area.

The size 220 and interval 172 may be varied algorithmically. For example, one formula may be used to vary the size 220 based on system debt 310, total capacity 320, and free capacity 330. Another formula may be used to vary the interval 172 based on system debt 310 and free capacity 330. As an alternative, machine learning may be applied to select optimal values of size 220 and interval 172 based on circumstances to maximize system throughput.

Figure 4:
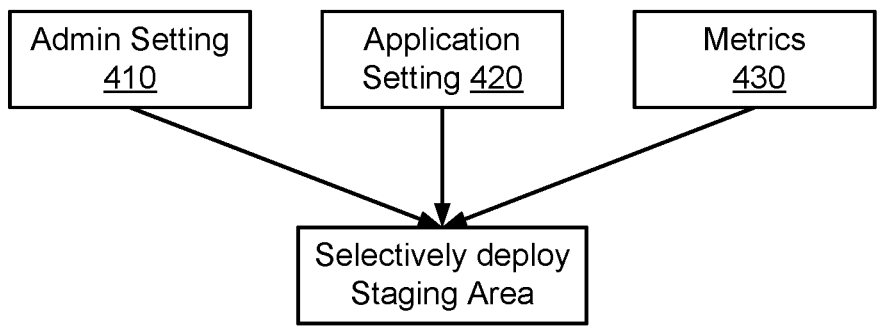
FIG. 4 is a diagram of example factors that contribute to determining whether to deploy a staging area.

FIG. 4 shows an example arrangement for selectively determining whether to deploy a staging area 170 in a data storage system 116. Although the use of a staging area can greatly improve performance in the presence of frequent overwrites, it may not be beneficial in all scenarios.

Various options are shown. These include an administrator setting 410, an application setting 420, and an automatic procedure 430. The administrator setting 410 may be provided for selectively deploying a staging area via a user interface of the data storage system 116. A checkbox, button, or other control may be provided for this purpose. Also, administrators may selectively deploy staging areas on a per-volume basis, for certain volumes but not for others. Selective deployment of a staging area 170 may be based on application setting 420. For example, the data storage system 116 may have a list of host applications known to perform frequent overwrites, such as SAP Hana. If the storage system detects a host application on the list, the storage system can deploy the staging area automatically for use with that application, e.g., for all volumes accessed by that application. Deployment of a staging area 170 may also be based automatically on system metrics 430, as described below.

Figure 5:
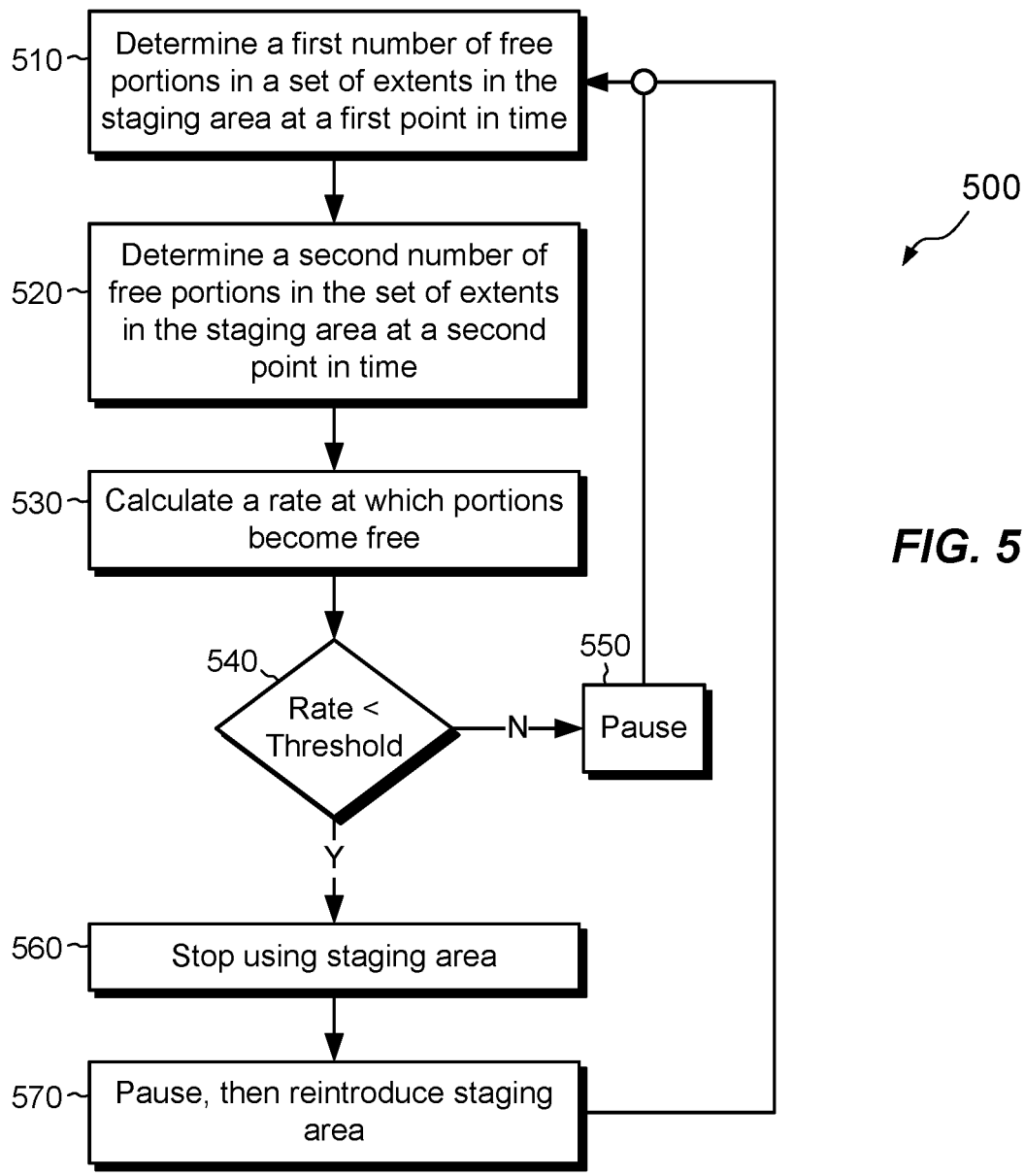
FIG. 5 is a flowchart showing an example method of automatically determining whether to deploy a staging area.

FIG. 5 shows an example method 500 of automatically deploying or stopping the use of a staging area 170 based on system metrics. Here, the storage system 116 monitors the rate at which portions in storage extents of the staging area 170 become free. For example, storage extents 142 may include smaller increments of storage, such as physical large blocks (PLBs). In an example, each extent (sub-uber) may contain 4 k PLBs. System metadata tracks the status of PLBs, including an amount of free space in the PLBs. By monitoring the rate at which free space in PLBs increases, one can directly measure the rate at which overwrites are occurring.

The method 500 may begin at step 510, where a first number of free portions of storage space is determined in a set of extents 142 in the staging area 170 at a first point in time. For example, the set of extents 142 may include all extents 142 in the staging area or a representative number of those extents. The first number of free portions may be the amount of free space in the PLBs among the set of extents, for example. The amount of free space may be determined from system metadata.

At 520, the method 500 determines a second number of free portions in the set of extents in the staging area at a second instant in time. The same extents are checked as before, but at a later point in time, such that it can be determined how many additional portions of storage space became free during the interval between the first point in time and the second point in time.

At 530, the method 500 calculates a rate at which portions become free. For example, the rate may be calculated as (N2−N1)/(T2−T1), where N1 and N2 are the first and second numbers of free portions and T1 and T2 are the first and second points in time. One should appreciate that this calculated rate represents the rate at which data in the set of extents is overwritten during the time between T1 and T2.

At 540, the calculated rate is compared to a threshold. The threshold may be a fixed value or an administrator setting, for example. If the rate is greater than or equal to the threshold, operation proceeds to 550. The method 500 then pauses for a time, such as several minutes, and then resumes, returning operation to 510 whereupon the method 500 starts again.

If at 540 the rate is less than the threshold, operation proceeds instead to 560, whereupon use of the staging area 170 is terminated. The extents 142 tracked by the staging area 170 become immediately available for background processing. As an alternative to stopping use of the staging area at 560 altogether, the size 220 of the staging area may instead be reduced. In such cases the staging area may continue to operate, but on a smaller scale.

At 570 (assuming use of the staging area was terminated), the method 500 may pause for a time, such as several minutes, and then start using the staging area again. Operation then returns to 510, whereupon the method 500 repeats. In the manner described, use of the staging area 170 can continue or stop, and it can resume once stopped if data patterns change.

Figure 6:
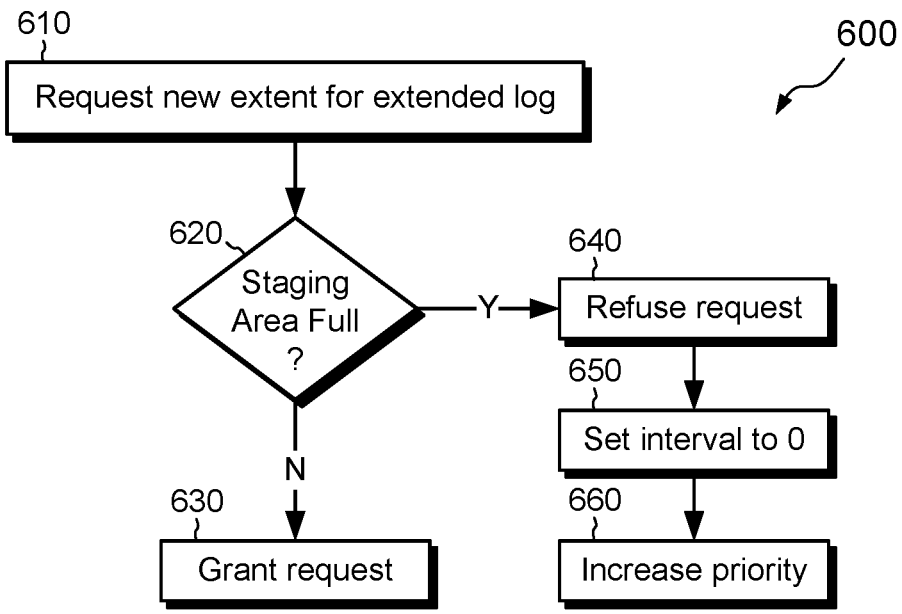
FIG. 6 is a flowchart showing an example method of responding to the staging area becoming full.

FIG. 6 shows an example method 600 for responding to the staging area 170 becoming full, i.e., reaching its maximum size 220. For example, at 610 the extended log 160 may request a new extent 142 from the extent manager 140 (FIG. 1), e.g., to provide space for receiving data arriving in write requests 112w. At 620, the extended log 160 checks whether the staging area 170 is full (or whether it reaches some high-water mark). If the staging area is not full, the request is granted (630) and a new extent 142 is returned to the extended log 160. But if the staging area 170 is full, then the request is refused (640).

Refusing the request has the effect of stopping not only further growth of the staging area 170, but also further growth of the extended log 160. In this case, newly arriving writes 112w may have to wait for service until the staging area 170 is no longer full or until the primary log 150 has available capacity. To reduce or avoid performance impacts, the staging area 170 may reduce its specified time interval 172 to zero or near zero (650), so that all extents 142 contained therein become immediately available for background processing. The staging area may also direct a system scheduler (not shown) to increase priority (660) of background processing from the extended log 160, such that the storage system can pay down the accumulated processing debt quickly. The request at 610 can then be retried, eventually being granted once some of the debt is paid down.

Figure 7:
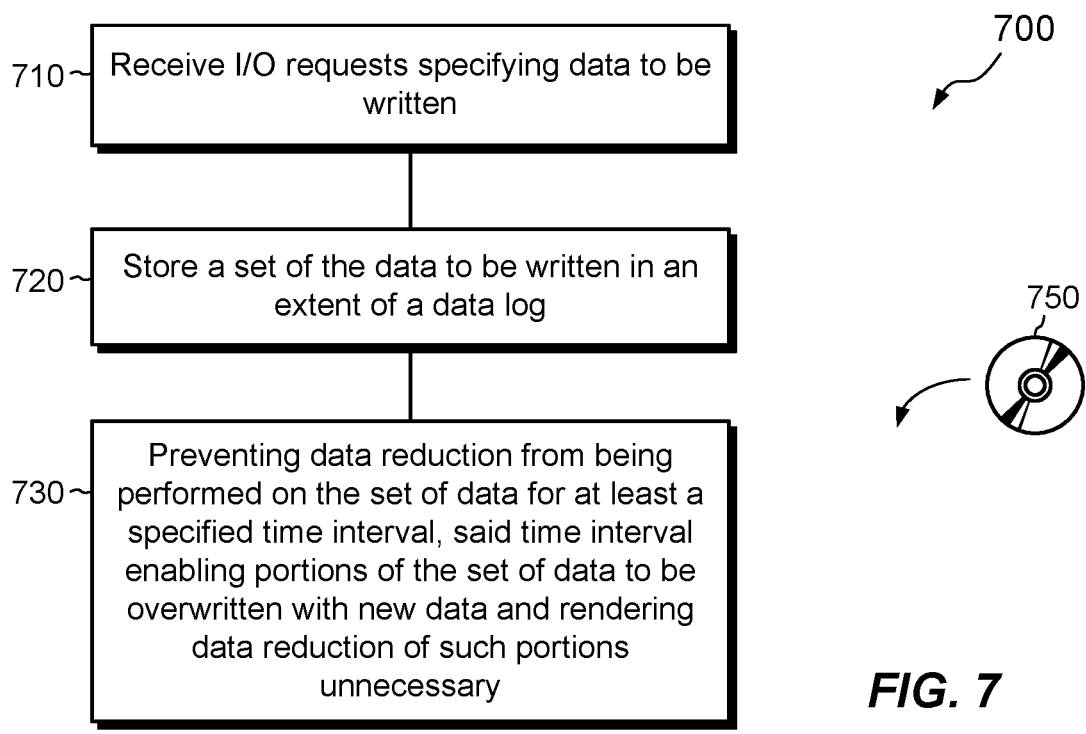
FIG. 7 is a flowchart showing an example method of managing writes in a data storage system.

FIG. 7 shows an example method 700 that may be carried out in connection with the environment 100 and provides an overview of some of the features described above. The method 700 is typically performed, for example, by the software constructs described in connection with FIG. 1, which reside in the memory 130 of a node 120 and are run by the set of processors 124. The various acts of method 700 may be ordered in any suitable way. Accordingly, embodiments may be constructed in which acts are performed in orders different from that illustrated, which may include performing some acts simultaneously.

At 710, the storage system receives I/O requests 112w specifying data to be written. Some of the I/O requests are directed to the extended log 160, which is also referred to herein as the "data log."

At 720, the data log stores a set of the data 118 specified in the I/O requests 112w in an extent 142 of the data log 160.

At 730, data reduction is prevented on the set of data for at least a specified time interval 172. The time interval 172 enables portions 154 of the set of data 118 to be overwritten with new data and renders data reduction of such portions unnecessary.

An improved technique has been described for managing a data log 160. The technique includes preventing background data reduction operations from being performed on data in extents 142 of storage managed by the data log 160 until a specified interval of time 172 expires. The specified interval of time 172 allows new writes 112w from applications 110a to replace previous writes, rendering it unnecessary to perform data reduction on data logged during the previous writes.

Having described certain embodiments, numerous alternative embodiments or variations can be made. For example, although embodiments have been described that use both a primary log 150 and an extended log 160, other embodiments may be constructed that include only a single data log, which is configured like the extended log 160. In such embodiments, a primary log 150 is not required.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing writes in a data storage system, comprising:
   receiving I/O requests specifying data to be written;
   storing a set of the data to be written in an extent of a data log; and
   preventing data reduction from being performed on the set of data in the extent for at least a specified time interval, said time interval enabling portions of the set of data to be overwritten with new data and rendering data reduction of such portions unnecessary.

2. The method of claim 1, wherein preventing data reduction includes tracking the extent in a staging area, the staging area configured to track multiple extents and having a size that limits a maximum number of extents that can be tracked by the staging area at a time.

3. The method of claim 2, further comprising:
   removing the extent from the staging area upon expiration of the time interval; and
   performing data reduction on portions of the extent that were not overwritten during the time interval.

4. The method of claim 2, further comprising varying the specified time interval responsive to changing circumstances in the data storage system.

5. The method of claim 4, wherein the changing circumstances include any of (i) changes in free storage capacity of the data storage system and (ii) changes in accumulated processing debt in the data storage system.

6. The method of claim 2, further comprising varying the size of the staging area in response to changing circumstances in the data storage system.

7. The method of claim 6, wherein the changing circumstances causing the size of the staging area to be varied include any of (i) changes in free storage capacity of the data storage system and (ii) changes in accumulated processing debt in the data storage system.

8. The method of claim 2, further comprising determining whether to use the staging area on a per-volume basis.

9. The method of claim 2, further comprising determining whether to use the staging area based on an administrator setting.

10. The method of claim 2, further comprising determining whether to use the staging area based on a software application being used.

11. The method of claim 2, further comprising:
    determining a first number of free portions in a set of extents in the staging area at a first point in time;
    determining a second number of free portions in the set of extents in the staging area at a second point in time later than the first point of time;
    calculating a rate at which portions become free based on the first number, the second number, the first point in time, and the second point in time; and
    terminating use of the staging area or reducing the size of the staging area in response to the rate falling below a threshold.

12. The method of claim 2, wherein the data log is an extended log backed to a first set of storage media, and wherein the method further comprises:
    receiving a second set of data into a primary log backed by a second set of storage media; and
    performing data reduction on the second set of data without waiting any specified interval of time.

13. The method of claim 2, further comprising blocking new extents from entering the log in response to the maximum number of extents in the staging area being reached.

14. A computerized apparatus, comprising control circuitry that includes a set of processors coupled to memory, the control circuitry constructed and arranged to:
    receive I/O requests specifying data to be written;
    store a set of the data to be written in an extent of a data log; and
    prevent data reduction from being performed on the set of data in the extent for at least a specified time interval, said time interval enabling portions of the set of data to be overwritten with new data and rendering data reduction of such portions unnecessary.

15. A computer program product including a set of non-transitory, computer-readable media having instructions which, when executed by control circuitry of a computerized apparatus, cause the computerized apparatus to perform a method of managing writes in a data storage system, the method comprising:

receiving I/O requests specifying data to be written;

storing a set of the data to be written in an extent of a data log; and preventing data reduction from being performed on the set of data in the extent for at least a specified time interval, said time interval enabling portions of the set of data to be overwritten with new data and rendering data reduction of such portions unnecessary.

16. The computer program product of claim 15, wherein preventing data reduction includes tracking the extent in a staging area, the staging area configured to track multiple extents and having a size that limits a maximum number of extents that can be tracked by the staging area at a time.

17. The computer program product of claim 16, wherein the method further comprises:

removing the extent from the staging area upon expiration of the time interval; and performing data reduction on portions of the extent that were not overwritten during the time interval.

18. The computer program product of claim 16, wherein the method further comprises varying the specified time interval and the size of the staging area responsive to changing circumstances in the data storage system.

19. The computer program product of claim 16, wherein the method further comprises:

determining a first number of free portions in a set of extents in the staging area at a first point in time;

determining a second number of free portions in the set of extents in the staging area at a second point in time later than the first point of time;

calculating a rate at which portions become free based on the first number, the second number, the first point in time, and the second point in time; and terminating use of the staging area or reducing the size of the staging area in response to the rate falling below a threshold.

20. The computer program product of claim 16, wherein the method further comprises blocking new extents from entering the log in response to the maximum number of extents in the staging area being reached.

\* \* \* \* \*